United States Patent [19]
Armstrong, II

[11] Patent Number: 5,352,970
[45] Date of Patent: Oct. 4, 1994

[54] POWER RESOURCE MANAGEMENT SYSTEM

[75] Inventor: Gene L. Armstrong, II, Garland, Tex.

[73] Assignee: Benchmarq Microelectronics, Inc., Carrollton, Tex.

[21] Appl. No.: 981,283

[22] Filed: Nov. 25, 1992

[51] Int. Cl.$^5$ .............................. H02J 7/10
[52] U.S. Cl. ........................ 320/39; 307/52
[58] Field of Search ............ 320/39; 307/52

[56] References Cited

U.S. PATENT DOCUMENTS

| | | | |
|---|---|---|---|
| 3,691,448 | 9/1972 | Milward | 320/39 |
| 3,697,850 | 10/1972 | Heinrich et al. | 320/39 |
| 4,716,353 | 12/1987 | Engelmann | 320/21 |

Primary Examiner—R. J. Hickey
Attorney, Agent, or Firm—Ross, Howison, Clapp & Korn

[57] ABSTRACT

A power resource management system includes a battery charging system (20) that is connected between a positive voltage terminal and a voltage sense terminal (15). An operating system (10), that in one mode operates off of the battery and in a second and charging mode operates off the power source (24), is connected between the positive terminal (12) and the voltage sense node (15). A sense resistor (16) is connected between the voltage sense node (15) and a ground terminal (18). The power source (24) is operable to deliver voltage across the positive terminal (12) and the negative terminal (18). The battery charger (20) includes a charge modulator (24) and a buck regulator which has a switch (26) that is controlled by the controller (34). The controller (34) receives the voltage on the node (15) and controls the switch (26) in accordance with the voltage thereon, which voltage is a function of both the current supplied to the operating system (10) and the current supplied to the battery (22) for a charging operation. As the operating system current increases, the charge delivered to the battery decreases and, conversely, as the current to the operating system (10) decreases, the current delivered to a battery (22) increases.

11 Claims, 3 Drawing Sheets

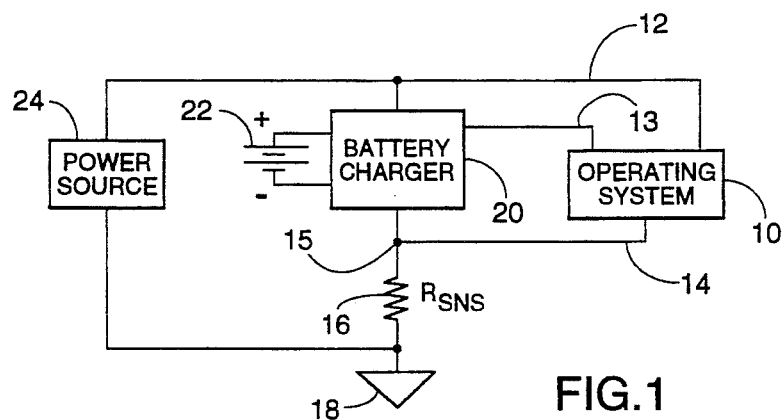
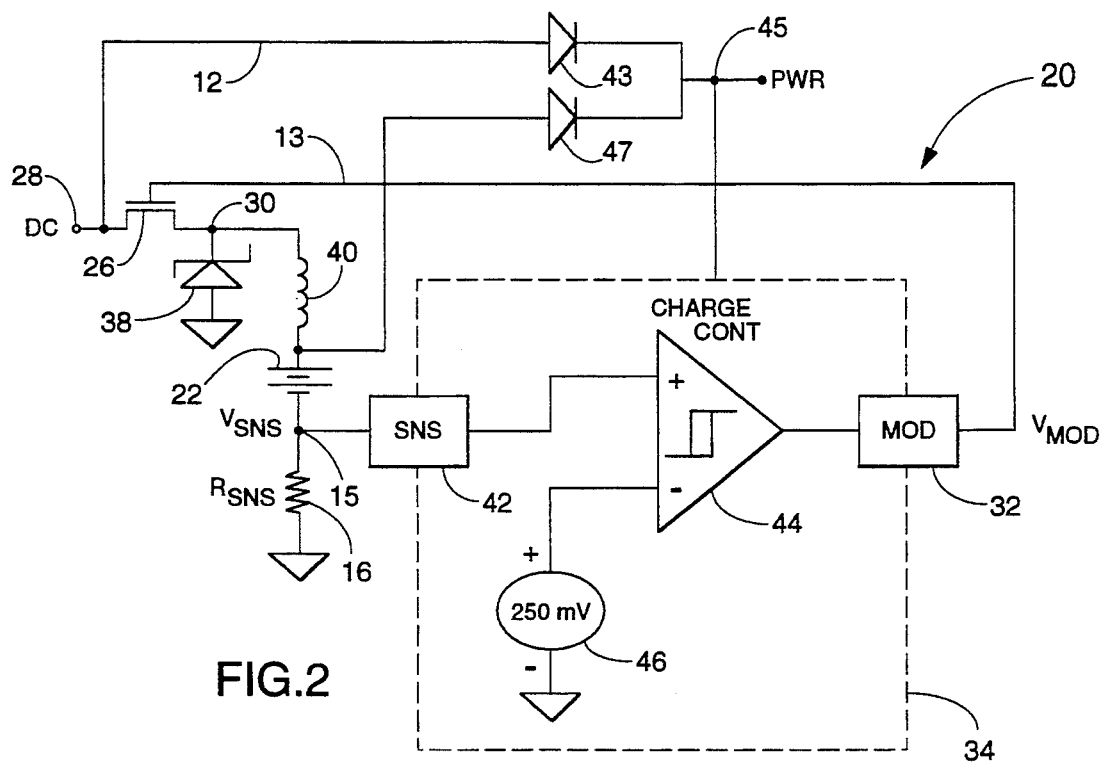
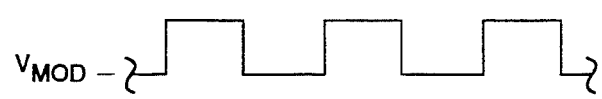
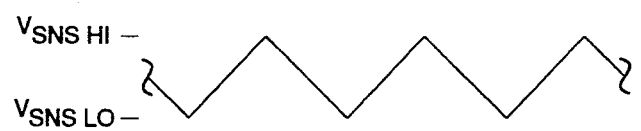

POWER RESOURCE MANAGEMENT SYSTEM

TECHNICAL FIELD OF THE INVENTION

The present invention pertains in general to systems for managing power resources, and more particularly, to a battery recharge system that arbitrates current delivered to the battery and to an operating system when charging of the battery is performed in parallel to provide power to the system from a finite power source.

BACKGROUND OF THE INVENTION

Present battery charging systems typically operate with the battery installed in the operating system. When the battery is depleted of charge, the battery charging system is attached to the battery to provide a DC charging voltage thereto. Typically, the DC supply can also power the operating system, with the charging operation performed in the background. However, design constraints for consumer products typically require that the power supply be designed with its current limit at a value less than the maximum anticipated load. For most situations, this is acceptable. However, in certain situations the combination of the current drain due to battery charging and the current drain due to system operation may exceed the current capabilities of the power source. For example, if an individual is utilizing a battery powered razor with a rechargeable battery and the battery runs down, that individual may wish to plug in the power adapter/charger and continue shaving. Under this condition, the battery is seriously depleted and will therefore place a high current load on the charger. Although the charger can usually handle the charging operation, when the individual wishes to continue shaving at the same time that the depleted battery is charging, this typically will exceed the current limits designed into the charger, this resulting in failure of the charger. Current systems do not provide for arbitration to insure that the current supplied to the battery is minimized or regulated during system operation.

SUMMARY OF THE INVENTION

The present invention disclosed and claimed herein compromises a power management system for managing power distribution between an operating system and a recharging operation of a battery. A positive power terminal is provided that is connected to the positive output of a DC power source and the positive input of the operating system. A battery charge regulation circuit is operable to regulate power from a DC power source to the battery as a function of a charge control signal. A current sensor senses the power drawn from the DC power source by both the operating system and the battery through the battery charge regulation circuit. A regulation control circuit generates the charge control signal to control the battery charge regulation circuit to vary the current to the battery. This maintains the power drawn from the DC power source below a predetermined level.

In another aspect of the present invention, the current sensor includes a sense node connected to the negative terminal of the battery and the negative terminal of the operating system. A sense resistor is provided that is disposed between the sense node and the negative terminal of the DC power source. The voltage developed across the sense resistor corresponds to the combined current of the operating system and the battery. The regulation control circuit includes a comparator that is operable to compare the voltage from the sense node with a predetermined reference voltage. When the voltage is above the predetermined reference, charge to the battery is reduced. When the voltage on the sense node is below the predetermined reference, charge to the battery is increased.

In a yet further aspect of the present invention, the battery charge regulating circuit is comprised of a switching regulator having a switch associated therewith. The regulator outputs pulses that determine the charge supplied to the battery, this comprising a buck regulator.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates an overall block diagram of the power resource management system of the present invention;

FIG. 2 illustrates a simplified schematic of the battery charging system;

FIG. 3 illustrates waveforms depicting the operation of the switching regulator;

DETAILED DESCRIPTION OF THE INVENTION

Figure 4:
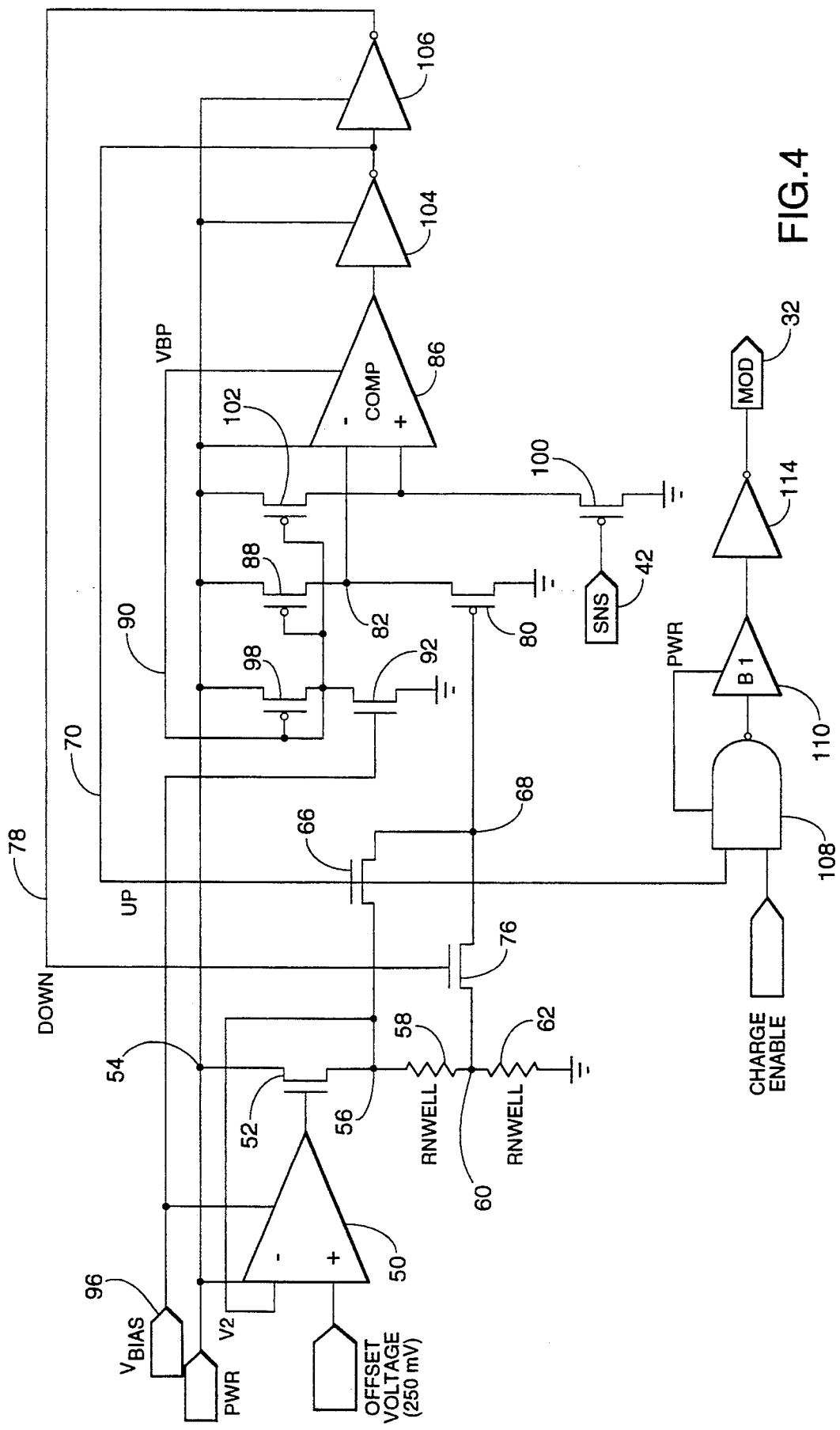
FIG. 4 illustrates a detailed logic diagram of the switching controller.

Referring now to FIG. 1, there is illustrated a general block diagram of the overall power resource management system of the present invention. An operating system 10 is provided that is disposed between a positive DC terminal 12 and a negative system terminal 14. The negative system terminal 14 is connected to a sense node 15 on one side of a sense resistor 16, the other side thereof connected to ground at a terminal 18. Sometimes, this ground terminal is referred to as $V_{SS}$.

A battery charger charging system 20 is provided which is connected between the node 15 and positive terminal 12, the battery charger 20 is operable to charge a battery 22. Battery 22 is also operable to generate the positive voltage on a terminal 13 in a non-charging mode for output to the operating system 10. A power source 24 is provided which is connected on the positive side thereof to positive terminal 12 and on the negative side thereof to the ground terminal 18. The power source 24 is operable to provide power to the battery charging system 20 to charge the battery 22 and also to provide operating current to the operating system 10.

In operation, the battery charging system 20 draws a predetermined amount of current from the power source 24, depending upon the charge state of the battery 22. Additionally, the operating system 10 will provide a variable load to the terminal 12. However, it can be seen that the voltage across the sense resistor 16 is a function of the current that is supplied to both the operating system 10 and the battery charger 20. The battery charger 20 is operable to sense the voltage on the sense resistor 16 and adjust the amount of current or charge that is input to the battery 22 as a function thereof. As such, the amount of current supplied to the battery 22 during charging is a function of the amount of current utilized by the operating system 10. When the operating system 10 is presented with the condition that results in a higher current dram, the amount of current supplied to the battery 22 during charging is reduced. Conversely, when the load required by the operating system 10 reduces the current draw from the power source 24, the battery charging system 20 increases the current to the battery 22 for charging purposes. This is compared to systems that would require the battery charging system 20 to go to a trickle charge or low power mode. This is an adaptive charging system that is a function of the load presented by the operating system 10 as opposed to merely changing modes to insure that the maximum charge is supplied to the battery 22 without exceeding the current limits of the power source 24.

Referring now to FIG. 2, there is illustrated a more detailed block diagram of the battery charging system 20 of FIG. 1. A switching element such as a field effect transistor 26 has one side of the source/drain path thereof connected to a DC input node 28 and the other side thereof connected to a node 30. The gate of the transistor 26 is connected to a MOD output pad 32 of a charge controller 34. The node 30 is connected to the cathode of a Schottky diode 38, the anode of the diode 38 connected to ground. The node 30 is also connected to one side of an inductor 40, the other side thereof connected to the positive terminal of the battery 22. The transistor 26, the diode 38 and the inductor 40 provide a constant-current buck regulator which is controlled by the voltage $V_{MOD}$ output by the MOD pad 32 and connected to the gate of a transistor 26. By controlling the voltage $V_{MOD}$, the current supplied to the battery 22 can be regulated.

The negative terminal of the battery 22 is connected to the node 15 at the voltage $V_{SNS}$. Node 15, as described above, is connected to one side of the sense resistor 16 ($R_{SNS}$). The node 15 is also connected to a sense pad (SNS) 42, which provides an input to the charge controller 34. The charge controller 34 has disposed therein a differential comparator with hysteresis 44 which has two inputs, one input connected to the sense pad 42 and the other input connected to one side of a voltage offset device 46, the voltage offset device 46 providing a 250 millivolt offset. The comparator 44 is operable to control the MOD pad 32 to switch the voltage thereon high or low depending on the voltage input to the SNS pin 42. When the voltage at the SNS pin 42 is less than a voltage $V_{SNSLO}$, which is approximately 0.22 V nominal, MOD pad 42 is switched high, drawing current from the supply. However, when the voltage on the SNS pin 42 is greater than $V_{SNSHI}$, which is approximately 0.250V nominal, the MOD pad 32 is switched low, shutting off the current from the supply.

The DC input to the transistor 26 is connected through a diode 43 to a power node (PWR) 45, this providing power to the operating system 10 and the charge controller 34. The positive terminal of the battery 22 is also connected to the PWR node 45 through a diode 47. The higher of the voltages on the DC input and the battery 22 will supply power to the power node 45.

Referring now to FIG. 3, there are illustrated two waveforms, a top waveform and a bottom waveform. The top waveform illustrates the output $V_{MOD}$ on the MOD pin 32 and the bottom waveform represents the waveform $V_{SNS}$ on the node 15 that is input to the SNS pad 42.

Referring now to FIG. 4, there is illustrated a detailed diagram of the charge controller 34. The offset voltage from the source 46 is input to the positive input of an operational amplifier 50 with the output connected to the gate of an N-channel transistor 52. The source/drain of the N-channel transistor 52 is connected between a power rail 54 that provides a positive power supply voltage and which is connected to a PWR input, the other side of the source/drain path of transistor 52 connected to a high reference voltage node 56. The node 56 is also connected to the negative input 56. of the operational amplifier 50. The operational amplifier 50 is thus configured as a buffer with the voltage on the positive input thereof being substantially the same voltage as that on the node 56. The node 56 is connected through a resistor 58 to a low voltage node 60. Node 60 is connected through a resistor 62 to ground. In this configuration, the voltage on node 56 is approximately 0.250 mV and voltage on the node 60 is approximately 0.220 mV.

The node 56 is connected to one side of the source/drain path of an N-channel transistor 66 and the other side thereof connected to a node 68. The gate of transistor 66 is connected to a node 70 labelled UP. The node 60 is connected to one side of the source/drain path of an N-channel transistor 76, the other side of the source/drain path thereof connected to the node 68. The gate of transistor 76 is connected to a node 78 labelled DOWN. The node 68 is connected to the gate of the P-channel transistor 80, the source/drain path thereof connected between a node 82 and ground. The transistors 66 and 76 are operable to select the high or low voltage on the nodes 56 and 60, respectively. The node 82 is connected to the negative input of a comparator 86 to provide a reference voltage thereto. Node 82 is also connected to one side of the source/drain path of a P-channel transistor 88, the other side thereof connected to the power rail 54. The gate of transistor 88 is connected to a bias voltage node 90. The bias voltage node 90 is connected to one side of the source/drain path of an N-channel transistor 92, the other side thereof connected to ground. The gate of transistor 92 is connected to a bias input pin 96 to provide a predetermined bias to the transistor 92. The node 90 is also connected to one side of the source/drain path of a P-channel transistor 98, the other side thereof connected to the power terminal 54, the gate of transistor 98 connected to the node 90. Transistors 92 and 98 therefore form a bias current multiplier circuit for the signal level translator constituted by transistors 92, 98, 80 and 88. The bias voltage on node 90 is also input a bias input of the comparator 86.

The output of the SNS pin 42 is connected to the gate of the P-channel transistor 100. The source/drain path of a transistor 100 is connected on one side to the positive input of the comparator 86, and on the other side thereof to ground. The positive input of the comparator 86 is also connected to one side of the source/drain path of a P-channel transistor 102, the other side thereof connected to the power terminal 54. The gate of transistor 102 is connected to the bias node 90.

The output of comparator 86 is connected to the input of an inverter 104. The output of the inverter 104 is connected to the input of a second inverter 106. The output of inverter 104 is connected to the U node 70 and the output of the comparator 106 is connected to the DOWN node 78. The UP node 70 is connected to one input of a NAND gate 108, the other input of the NAND gate 108 is connected to a Charge Enable signal, which signal is an internally generated signal. In general, this is held high. Although not illustrated, the charge modulator 44 is part of a larger circuit, the operation of which is not concerned with the present invention. As such, the voltage on the Charge Enable Pin is held high. Therefore, the NAND gate 108 functions as an inverter. The output of the NAND gate 108 is connected to the input of a driver 110, the output thereof connected through an inverter 114 to the MOD pad 32.

In operation, it can be seen that the voltage on the SNS pin 42 is connected through the P-channel transistor 100 to the positive input of the comparator 86, the comparator 86 operable to compare that voltage with the voltage on nodes 56 and 60, depending upon which one is selected by the control nodes 70 and 78, respectively. These two nodes 56 and 60 and the associated resistors 58 and 62 provide hysteresis for the circuit such that if the voltage SNS pad 42 rises above 0.250 mV in one mode, it will switch, and the next operation will require it to fall below 0.250 mV.

Figure 5:
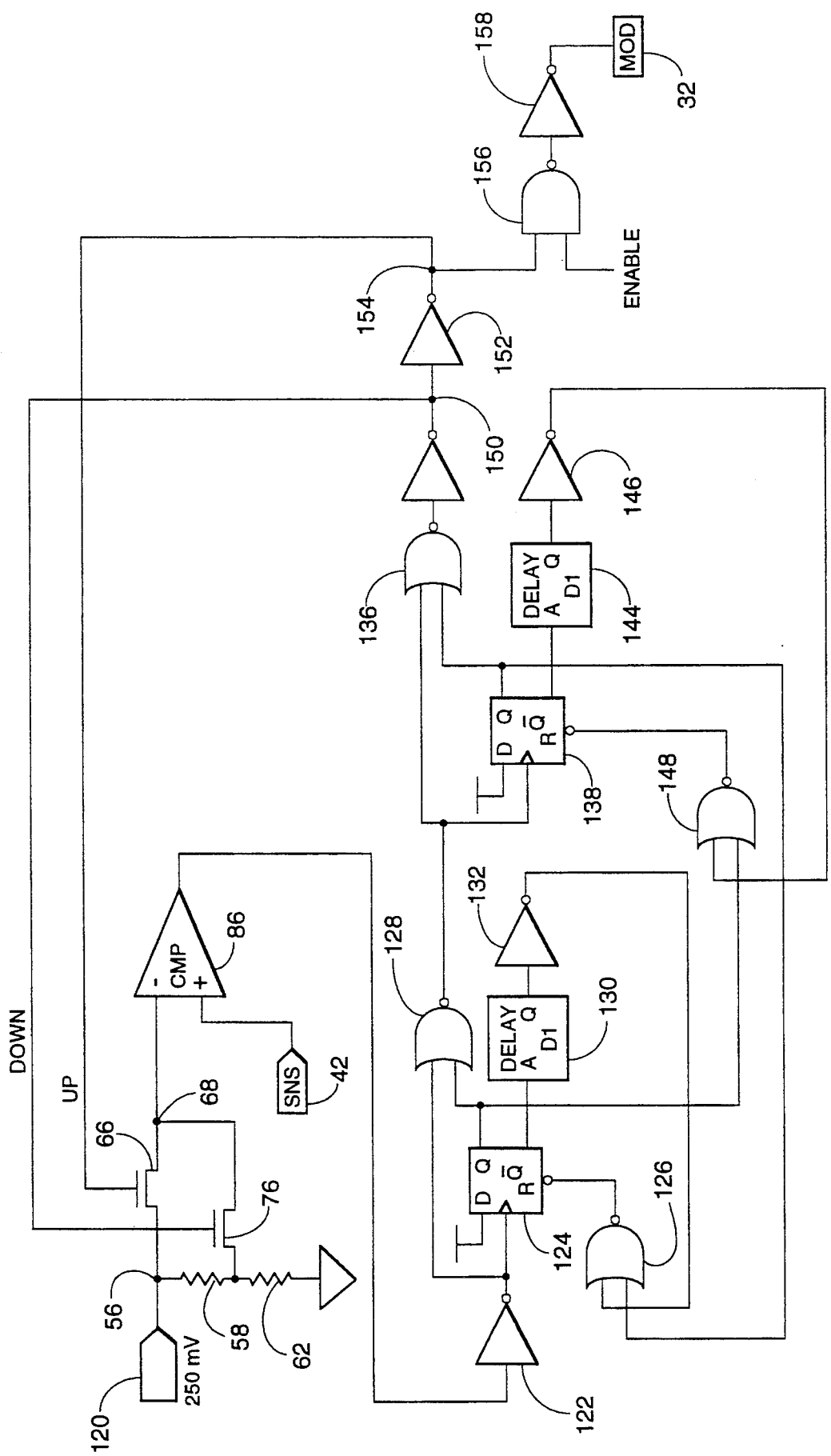
FIG. 5 illustrates an alternate embodiment of the switching controller.

Referring now to FIG. 5, there is illustrated an alternate embodiment of the switched controller depicted in FIG 4. The 250 mV signal is input through the input pin 120, directly to the node 56, which node 56 is connected through the series connected resistors 58 and 62 to ground. The transistors 66 and 76 provide the selection of voltage at either the top of the resistor 58 or at the divided point between the resistors 58 and 62. These are connected to the node 68, described above with reference to FIG. 4. However, node 68 is connected directly to the negative input of the comparator 86, with the sense input pad 42 connected directly to the positive input thereof.

The output of comparator 86 is input through an inverter 122 to the clock input of a D-type flip flop 124. The D-input flip flop 124 is connected to the positive supply. The reset input is an active low input and is connected to the output of a NOR gate 126. The Q-output of flip flop 124 is connected to one input of a NOR gate 128, the other input thereof connected to the output of the inverter 122. The Q-bar output of flip flop 124 is connected to the input of a delay circuit 130, the output thereof connected through an inverter 132 to one input of the NOR gate 126. The output of the NOR gate 128 is connected to one input of a NOR gate 136 and also to the clock input a D-type flip flop 138. The D-input of flip flop 138 is connected to the positive voltage supply and the Q-output thereof is connected both to the other input of the NOR gate 136 and also to the other input of the NOR gate 126. The Q-bar output of flip flop 138 is connected to the input of a second delay circuit 144, the output thereof connected through an inverter 146 to one input of a NOR gate 148, the output thereof connected to the reset input of the flip flop 138. The other input of NOR gate 148 is connected to the Q-output of flip flop 124. The output of NOR gate 136 is connected through an inverter to a node 150, the node 150 connected to the input of an inverter 152. The output of the inverter 152 is comprised of a node 154. Node 150 is connected to the gate of transistor 76 and labelled "DOWN", and the node 154 is connected to the gate of transistor 66 and labelled "UP". Node 154 is connected to the input of a NAND gate 156, the other input thereof connected to an enable signal. The output of a NAND gate 156 is connected through inverter 158 to the MOD output pin 32.

In operation, one input of the NOR gate 128 goes high due to the voltage on the SNS pad 42 falling below the voltage on node 68, this clocking the flip flop 124. Additionally, this forces the output of NOR gate 128 to a low with the output of NOR gate 136 then being a high if the Q-output of flip flop 138 is also a low. This results in a logic "1" on node 150 and a logic "0" on node 154, thus turning transistor 66 on. The Q-output of the flip flop 124 also goes high such that both inputs of NOR gate 128 are held high. Therefore, if chatter exists on the output of comparator 86, this will not affect the logic state on the output of the NOR gate 128. As long as the Q-output of flip flop 124 is held high, transistor 66 remains in a conductive state. The delay circuit 130 provides a reset function after a predetermined time. When the output of inverter 132 goes high, the reset input is pulled low, thus resetting the Q-output to a low. After this, whenever the output of inverter 122 goes low, the output of NOR gate 128 will go high and node 150 will go high turning on transistor 76 and node 154 will go low, turning off transistor 66. This will occur when the voltage on the sense node 42 rises above the voltage on node 68.

When the output of NOR gate 128 goes high, this clocks the high voltage logic state on the D-input of flip flop 138 through to the Q-output thereof. This, therefore, "clamps" the output of NOR gate 136 to a low, thus clamping the voltage on node 150 high. This will continue for the delay provided by the delay circuit 144, after which the flip flop 138 will be reset by the output of the NOR gate 148. Additionally, during the time that the Q-output of the flip flop 138 is high, the flip flop 124 is forced in a reset mode. Similarly, when the Q-output of the flip flop 124 is high, this will hold the reset input of the flip flop 138 at an active low state. Therefore, the flip flops 124 and 138 and associated logic circuitry including the delays 130 and 144 provide a noise filter for both the negative and the positive edge of the comparator output.

In summary, there has been provided a power resource management circuit. The power resource management circuit includes a switching regulator that is operable to regulate the current to a battery for the purpose of providing regulated current thereto. The Modulating input for the switching regulator is a function of the current supplied to the battery and also the current supplied to an operating system. A sense resistor is provided through which the current of the regulator and the current provided to the operating system flows. By sensing the voltage on the resistor, the current to the battery can be decreased for an increasing current to the operating system and, conversely, a decreasing current to the operating system will result in an increase of current to the battery.

Although the preferred embodiment has been described in detail, it should be understood that various changes, substitutions and alterations can be made therein without departing from the spirit and scope of the invention as defined by the appended claims.

What is claimed is:

1. A power management system for managing power distribution between an operating system and the recharging operation of a battery, comprising:
    a positive power terminal for being connected to the positive output of the DC power source and the positive input of the operating system;
    a battery charge regulating circuit for regulating the current to the battery from the positive terminal of the DC power source as a function of a charge control signal;

a power sensor for sensing the power drawn from the DC power source by the operating system and from the DC power source by the battery through the battery charge regulation circuit; and a regulation control circuit for generating said charge control signal to control said battery charge regulation circuit to vary the current to the battery to maintain the power drawn from the DC power source below a predetermined level.

2. The power management system of claim 3, wherein said power sensor is operable to sense current.

3. The power management system of claim 2, wherein said power sensor is operable to sense a combined current, which combined current is the sum of the current drawn by the battery through said battery regulation circuit and the operating system.

4. The power management system of claim 1, wherein said power sensor comprises:

a sense node connected to the negative terminal of the operating system and the negative terminal of the battery; and a sense resistor disposed between said sense node and the negative terminal of the DC power source and said regulation control signal utilizing the voltage at said sense node for use in determining the combined current comprising the current supplied to the operating system and the current supplied to the battery through said battery charge regulation circuit.

5. The power management system of claim 1, wherein said battery charge regulation circuit comprises a switching regulator having a switch associated therewith, said switch receiving said charge control signal in the form of pulses of a predetermined width, said switch conducting during the duration of said pulse and wherein said regulation control circuit comprises:

a modulator circuit for generating said pulses on an output, said modulation circuit operable to generate said pulses when the voltage on said sense node is below a predetermined level.

6. The power management system of claim 5, wherein said modulator circuit output is operable to alternate between an off-mode and on-mode, said off-mode occurring prior to the generation of each of said pulses, said on-mode occurring during the generation of each of said pulses, wherein said modulator switches from the off-mode to the on-mode when the voltage on said sense node falls below a first predetermined voltage and to switch from said on-mode to said off-mode when said sense node rises above a second predetermined voltage greater than said first predetermined voltage.

7. A method for managing power distribution between an operating system and the recharging operation of a battery, comprising:

connecting the positive input of the operating system to the positive input of a DC power source;

regulating the current supplied to the battery to provide a current level thereto that varies as a function of a charge control signal;

sensing the power drawn from the DC power source by the operating system and the battery through the step of regulating; and generating the charge control operable to control the step of regulating to vary the current to the battery to maintain the power drawn from the DC power source to a predetermined level.

8. The method of claim 7, wherein the step of sensing the path comprises sensing the current provided to the operating system of the DC power source and to the battery in the step of regulating.

9. The method of claim 7, wherein the step of sensing comprises:

connecting the negative terminal of the operating system and the negative terminal of the battery to a sense node;

disposing a sense resistor between the sense node and the negative terminal of the DC power source; and measuring the voltage on the sense node to provide an indication of the current provided by the DC power source to the operating system from the DC power source and to the battery from the DC power source through the step of regulating.

10. The method of claim 7, wherein the step of regulating the current to the battery during the charging operation comprises switching power to the positive terminal of the battery from the DC power supply through a switching regulator circuit having a switch associated therewith, the associated switch controlled by the charge control signal to switch at a duty cycle determined by the charge control signal.

11. The method of claim 7, wherein the step of generating the charge control signal comprises comparing the voltage on the sense node to a predetermined reference voltage; and generating a control signal to cause the switch in the switching regulator circuit to conduct when the voltage on the sense node is below the reference voltage.

* * * * *

UNITED STATES PATENT AND TRADEMARK OFFICE
CERTIFICATE OF CORRECTION

PATENT NO. : 5,352,970

DATED : October 4, 1994

INVENTOR(S) : Gene L. Armstrong, II

It is certified that error appears in the above-identified patent and that said Letters Patent is hereby corrected as shown below:

Column 3, line 2, replace "dram" with --drawn--.

Column 3, line 65, replace "$V_{MOD}$on" with --$V_{MOD}$ on--.

Column 3, line 67, replace "$V_{SNS}$on" with --$V_{SNS}$ on--.

Column 4, line 65, replace "U" with --UP--.

Column 6, line 45, replace "Modulating" with --modulating--.

Signed and Sealed this

Tenth Day of January, 1995

*Attest:*

BRUCE LEHMAN

*Attesting Officer*   *Commissioner of Patents and Trademarks*